May 24, 1938.   G. L. WALKER   2,118,447
TORCH
Filed Feb. 3, 1936
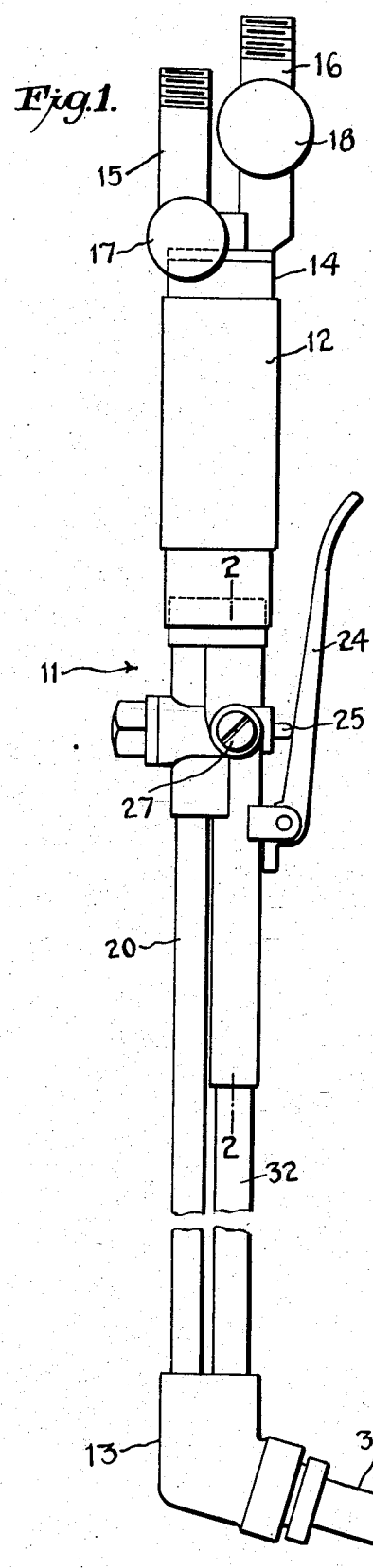
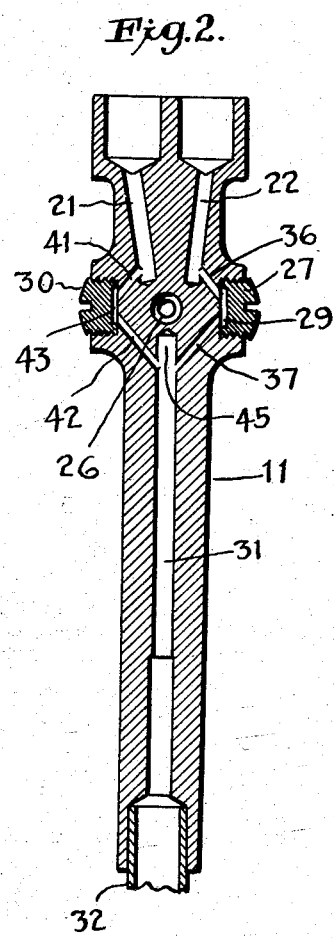
INVENTOR
George L. Walker
BY
J. Brandenburg ATTORNEY Patented May 24, 1938

2,118,447

UNITED STATES PATENT OFFICE 2,118,447

TORCH

George L. Walker, Jersey City, N. J., assignor to Air Reduction Company, Incorporated, New York, N. Y., a corporation of New York Application February 3, 1936, Serial No. 62,056

8 Claims. (Cl. 158—27.4)

This invention relates to torches or blowpipes which operate with oxygen and fuel gas for the cutting, welding or heating of metals.

One of the objects of the invention is to provide a torch mixer which is of simple construction and easy to manufacture, and which secures good mixing of the oxygen and fuel gas.

Another object is to provide a construction in which the mixer is incorporated as an integral part of a body portion of the torch and which permits of the manufacture of a light-weight but sturdy torch.

Another object is to facilitate cleaning of the mixer.

These objects are attained by the features of construction relation and operation which are described in the body of the specification and more particularly pointed out in the claims.

In the accompanying drawing forming part hereof:

Fig. 1 is an elevation of a cutting torch embodying the invention; and

Fig. 2 is a section taken on the line 2—2 of Fig. 1.

The novel features of the invention are particularly suitable for use in cutting torches, but it will be evident that they are equally applicable to welding or heating torches.

The torch illustrated in the drawing has a body portion 11 intermediate the ends of the torch. A handle 12 is secured to this body portion, and at the front end of the torch there is a head 13. At the rear end of the handle there is a rear body 14 having hose connections 15 and 16, provided with valves 17 and 18, to receive and control the oxygen and acetylene, or other fuel gas, respectively. By suitable passages and tubes the gases are conducted through the interior of the handle to the rear end of the body 11. These passages and tubes are not illustrated since they form no part of the invention and such matters are familiar to those versed in the art. Suffice it to say that in the two-hose cutting torch which has been selected for illustration, the oxygen flow is divided into two streams, one of which is conducted to the body 11 and through a passage (not shown) in this body, to and through a tube 20 to the head 13, and thence to the central passage of a tip 34. The cutting oxygen stream may be turned on and shut off by means of a lever 24 acting on a valve stem 25, which passes through an opening 26 in the body. No claim is made in respect to the cutting oxygen portions of the torch.

The other stream of oxygen is conducted to a socket in the rear end of the body 11, from which an oxygen inlet passage 21 extends forwardly in the body for a short distance. The fuel gas is conducted to another socket from which a fuel gas inlet passage 22 extends forwardly for a similar distance.

An inclined fuel gas port 36 extends forwardly from the passage 22 toward the side of the body 11, and another inclined port 37 extends forwardly and inwardly to meet the side of a longitudinal mixing passage 31, the ports 36 and 37 being in communication with each other. The oxygen is admitted from the passage 21 to the mixing passage 31 by similar ports 41 and 42, the inclinations of which are reverse to those of the ports 36 and 37. The ports are in the same longitudinal plane, and the ports 37 and 42 enter opposite sides of the mixing passage 31 at the same transverse region.

From the foregoing it will be perceived that the combustible and combustion-supporting gases are conducted from inlet or supply passages to the mixing passage by way of a pair of diverging ports and a pair of converging ports. The construction is highly satisfactory as regards mixing, and besides lends itself to economical manufacture since the ports 36, 37, 41 and 42 can be drilled easily from the opposite sides of the body.

The excellence of the mixing results to a considerable degree from the Y relation between the oxygen and fuel gas ports 41 and 36 and the mixing passage 31, upon which these ports converge at a rather broad angle. It is important, however, to resist persistent flashbacks, that is to say to bring about the extinguishment or flushing out of backfires which may occur with any torch. It has been found that in this construction an effective means for resisting or subduing flashbacks is a dead-end chamber 45 in line with the mixing passage 31 and extending back of the points of entry of the ports 37 and 42. The chamber must be large enough to affect a flashback. With a chamber 45, which is a rearward continuation of the mixing passage and of the same diameter, it has been found that flashback protection is obtained when the length of the chamber 45, back of the exits of the ports 37 and 42, is at least as great as the diameter.

After drilling of the ports 36, 37, 41 and 42, they might be permanently closed off at the outside. As a further and very advantageous feature, however, chambers are provided in the opposite sides of the body 11, and these are closed by removable screw caps 27 and 30. These chambers and caps are preferably so constructed that the spaces 29 and 43 of the chambers beneath the caps, through which spaces the rear ports 36 and 41 and the front ports 37 and 42 respectively communicate, are shallow, in order to preserve substantial continuity of flow of the gases as they approach the mixing passage. This is more important in respect to the fuel gas port-way 36, 29, 37, more especially when the fuel gas to be used is acetylene. The shallowness of the space 29 connecting the fuel gas ports 36 and 37 reduces turbulence to a minimum at the entrance to the front port, thus eliminating a factor which would be conducive to flashbacks.

In the particular construction illustrated the caps bottom in the lateral chambers of the body, and the spaces 29 and 43 are provided by slightly recessing the inner ends of the caps.

The removability of these caps makes it possible to clean the ports 36, 37, 41 and 42 of a mixer which is not removable but made as an integral part of a body of the torch. This is especially desirable in connection with the fuel gas ports, since momentary backfires tend eventually to deposit a certain amount of carbon in these ports. If the ports become obstructed to any serious extent it is a simple matter to take out the cap and to run a cleaning rod through the ports.

In the cutting torch embodiment of the invention shown herein the mixture of oxygen and fuel gas flows from the mixing passage 31 of the body 11 through a tube 32 to the head 34, from which it passes to the preheating jet passages 33 of a tip 34. In a welding torch the mixture would be delivered through the orifice of a welding tip.

I claim:

1. In a torch, a body having an oxygen inlet passage and a fuel gas inlet passage, a longitudinal mixing passage, lateral chambers, divergent ports leading from said inlet passages to said lateral chambers, convergent passages leading from said chambers directly into opposite sides of said mixing passage, and caps closing said chambers and so constructed as to cause substantial continuity of gas flow from the diverging ports to said converging passages.

2. In a torch, a body having a mixing passage, port-ways for admitting oxygen and fuel gas, respectively, to said passage, the port-way for the fuel gas comprising an outwardly inclined rear port, an inwardly inclined front port, a lateral chamber connecting said ports, and a removable cap for said chamber.

3. In a torch, a body having a mixing passage, port-ways for admitting oxygen and fuel gas, respectively, to said passage, the port-way for the fuel gas comprising an outwardly inclined rear port, an inwardly inclined front port, a lateral chamber connecting said ports, and a removable cap for said chamber, the space of said chamber beneath said cap being sufficiently shallow so that there will be substantial continuity of flow from the rear port to and through the front port.

4. In a torch, a body portion in which is a mixing passage, separate oxygen and fuel gas passages terminating in ports which extend through the body of the torch and open into the mixing passage and form therewith a mixer which is an integral part of the body of the torch, recesses in the sides of the torch body, each with a bottom wall through which one of said ports opens, another port opening through the bottom wall of each recess and communicating with a passage to one of the gas inlet connections of the torch, and a removable cap closing each recess and forming with that recess a chamber through which gas flows between the ports which open through the bottom of the recess.

5. In a torch having a body in which is a mixing passage, a recess in the outside wall of the torch body, a port opening through the bottom wall of the recess at one end and opening directly into the mixing passage at the other end, another port opening through the bottom wall of the recess and communicating with a passage through which gas is supplied to the torch, and a cap closing the open end of said recess and forming a chamber which is sufficiently shallow so that there will be substantial continuity of flow from one port to and through the other port.

6. In a torch having a mixer which is an integral part of a body of the torch, a mixing passage extending lengthwise of the body, a fuel gas passage between a gas inlet connection and the mixing passage, said fuel gas passage including two ports extending at acute angles into a chamber which connects them and through which both ports are accessible for cleaning, and a removable cap closing the chamber.

7. In a torch, a port-way through which gas flows from a gas inlet to a mixing passage, said port-way including two ports connected by a chamber, and a removable cap forming one side of the chamber, said ports opening into the chamber at such angles that the axes of the ports, if extended, will pass through the open side of the chamber when said cap is removed.

8. In a torch, a body having a oxygen inlet passage and a fuel gas inlet passage, diverging ports leading from said inlet passages, a mixer which is an integral part of the body of the torch and which comprises a longitudinal mixing passage, and convergent ports extending at obtuse angles to the divergent ports and communicating with said divergent ports and opening directly into said mixing passage from opposite sides.

GEORGE L. WALKER.